United States Patent
Kikuiri

(10) Patent No.: US 9,530,202 B2
(45) Date of Patent: Dec. 27, 2016

(54) INSPECTION APPARATUS AND INSPECTION METHOD

(71) Applicant: NuFlare Technology, Inc., Yokohama (JP)

(72) Inventor: Nobutaka Kikuiri, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 14/607,483

(22) Filed: Jan. 28, 2015

(65) Prior Publication Data

US 2015/0213587 A1    Jul. 30, 2015

(30) Foreign Application Priority Data

Jan. 30, 2014  (JP) ................................. 2014-016203

(51) Int. Cl.
*G06T 7/00*     (2006.01)
*G06K 9/52*     (2006.01)
*G06K 9/62*     (2006.01)

(52) U.S. Cl.
CPC ................. *G06T 7/001* (2013.01); *G06K 9/52* (2013.01); *G06K 9/6215* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 5,502,564 A | * | 3/1996 | Ledger ................... | G01B 11/14 356/503 |
| 6,982,793 B1 | * | 1/2006 | Yang ..................... | G03F 9/7076 356/401 |

(Continued)

FOREIGN PATENT DOCUMENTS

| | | |
|---|---|---|
| DE | 10 2007 033 814 A1 | 10/2008 |
| DE | 10 2007 035 519 A1 | 1/2009 |
| JP | 3824542 | 9/2006 |

OTHER PUBLICATIONS

U.S. Appl. No. 14/208,757, filed Mar. 13, 2014, Tsuchiya, et al.

(Continued)

*Primary Examiner* — Utpal Shah
*Assistant Examiner* — Kate R Duffy
(74) *Attorney, Agent, or Firm* — Oblon, McClelland, Maier & Neustadt, L.L.P.

(57) ABSTRACT

An inspection apparatus includes an optical image acquisition unit to acquire an optical image of a photomask on which a plurality of figure patterns are formed, a first measurement unit to measure a first positional deviation amount in the horizontal direction at each position on the photomask accompanying deflection of the surface of the photomask generated by supporting the photomask using a support method which is used for acquiring the optical image, a second measurement unit to measure a second positional deviation amount of each of the plurality of figure patterns, by using the optical image, and a difference map generation unit to generate a difference map in which a difference value obtained by subtracting the first positional deviation amount from the second positional deviation amount is used as a map value, with respect to a region on the surface of the photomask.

11 Claims, 11 Drawing Sheets

(56) References Cited

U.S. PATENT DOCUMENTS

| | | |
|---|---|---|
| 8,861,832 B2 | 10/2014 | Inoue et al. |
| 2005/0161615 A1 | 7/2005 | Maeda et al. |
| 2006/0126077 A1 | 6/2006 | Ueki et al. |
| 2009/0140390 A1* | 6/2009 | Nishiura ............. H01L 29/0657 257/615 |
| 2011/0255770 A1* | 10/2011 | Touya .................... G06T 7/001 382/144 |
| 2012/0140060 A1 | 6/2012 | Tsuchiya et al. |
| 2013/0044205 A1 | 2/2013 | Matsumoto et al. |
| 2013/0250095 A1 | 9/2013 | Inoue et al. |
| 2014/0002826 A1 | 1/2014 | Inoue et al. |
| 2014/0072202 A1 | 3/2014 | Ogawa et al. |
| 2014/0104412 A1 | 4/2014 | Inoue et al. |
| 2014/0348414 A1 | 11/2014 | Hashimoto et al. |

OTHER PUBLICATIONS

U.S. Appl. No. 14/529,297, filed Oct. 31, 2014, Isomura, et al.
U.S. Appl. No. 14/529,358, filed Oct. 31, 2014, Isomura, et al.
German Office Action issued Aug. 30, 2016 in German Patent Application No. 10 2015201437.1 (with English translation), 11 pages.

* cited by examiner

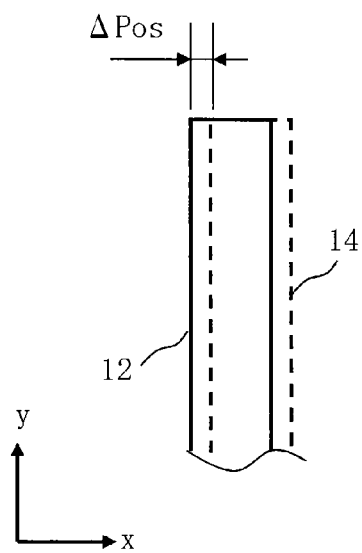
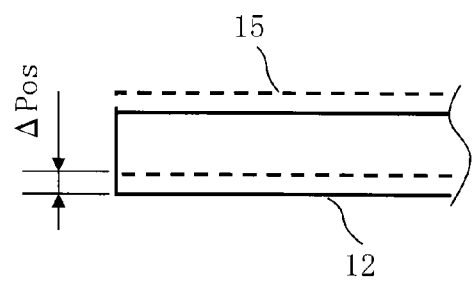
FIG. 10A  FIG. 10B
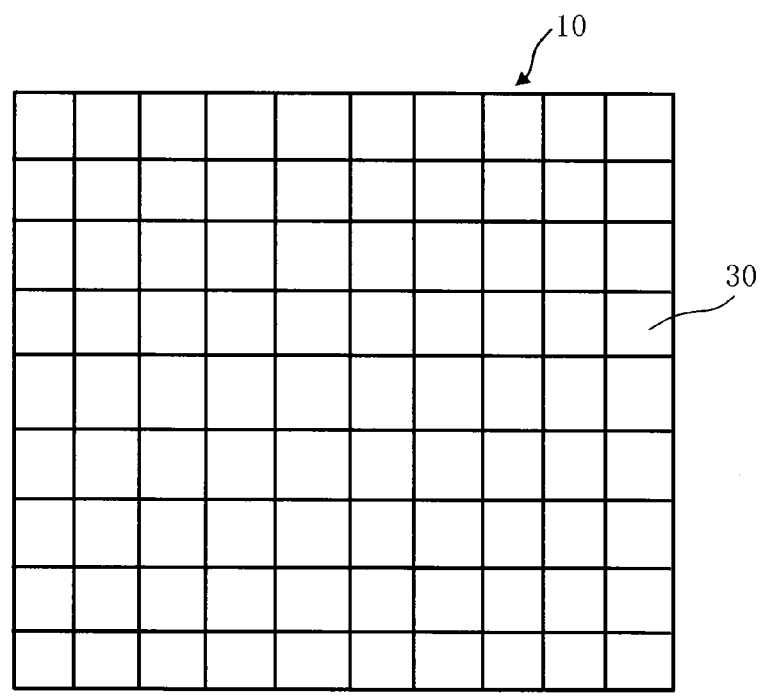
FIG. 11

INSPECTION APPARATUS AND INSPECTION METHOD

CROSS-REFERENCE TO RELATED APPLICATION

This application is based upon and claims the benefit of priority from the prior Japanese Patent Application No. 2014-016203 filed on Jan. 30, 2014 in Japan, the entire contents of which are incorporated herein by reference.

BACKGROUND OF THE INVENTION

Field of the Invention

The present invention relates to an inspection apparatus and an inspection method. Specifically, for example, the present invention relates to an inspection apparatus that inspects a pattern defect by acquiring an optical image of the pattern image on the substrate by applying laser irradiation thereto.

Description of Related Art

In recent years, with the advance of high integration and large capacity of a large scale integrated circuit (LSI), the line width (critical dimension) required for circuits of semiconductor elements is becoming progressively narrower. Such semiconductor elements are manufactured by exposing and transferring a pattern onto a wafer to form a circuit by means of a reduced projection exposure apparatus known as a stepper while using an original or "master" pattern (also called a mask or a reticle, and hereinafter generically referred to as a mask) with a circuit pattern formed thereon. Then, in fabricating a mask used for transferring (printing) such a fine circuit pattern onto a wafer, a pattern writing apparatus capable of writing or "drawing" fine circuit patterns by using electron beams needs to be employed. Pattern circuits may be written directly on the wafer by the pattern writing apparatus.

Since LSI manufacturing requires a tremendous amount of manufacturing cost, it is crucial to improve its yield. However, as typified by a 10-gigabit DRAM (Dynamic Random Access Memory), the scale of a pattern configuring an LSI has changed from on the order of submicrons to nanometers. One of major factors that decrease the yield of the LSI manufacturing is a pattern defect of a mask used when, by the photolithography technology, exposing and transferring (printing) a fine pattern onto a semiconductor wafer. In recent years, with miniaturization of dimensions of an LSI pattern formed on a semiconductor wafer, dimensions to be detected as a pattern defect have become extremely small. Thus, the pattern inspection apparatus that inspects a defect of a transfer mask used in manufacturing LSI needs to be highly precise.

As an inspection method, there is known a method of comparing an optical image of a pattern formed on a target object or "sample", such as a lithography mask, imaged at a predetermined magnification by using a magnification optical system, with design data or an optical image obtained by imaging the same pattern on the target object. For example, the following is known as pattern inspection methods: the "die-to-die inspection" method that compares data of optical images of identical patterns at different positions on the same mask; and the "die-to-database inspection" method that inputs, into the inspection apparatus, writing data (design pattern data) generated by converting pattern-designed CAD data into a writing apparatus specific format to be input to the writing apparatus when a pattern is written on the mask, generates design image data (reference image) based on the input writing data, and compares the generated design image data with an optical image (serving as measurement data) obtained by imaging the pattern. According to the inspection method for use in the inspection apparatus, a target object is placed on the stage so that a light flux may scan the object by the movement of the stage in order to perform an inspection. Specifically, the target object is irradiated with a light flux from the light source by the illumination optical system. Light transmitted through the target object or reflected therefrom is focused on a sensor through the optical system. An image captured by the sensor is transmitted as measurement data to the comparison circuit. In the comparison circuit, after performing position adjustment of images, measurement data and reference data are compared with each other in accordance with an appropriate algorithm. If there is no matching between the compared data, it is determined that there exists a pattern defect.

In mask inspection, in addition to inspecting a pattern defect (shape defect), it is also required to measure a pattern positional deviation. Conventionally, measuring a pattern positional deviation has been performed using a dedicated measuring device. If the apparatus that performs pattern defect inspection can measure a pattern positional deviation simultaneously with the inspection of a pattern defect, a significant advantage cost-wise and inspection-time-wise can be achieved. Therefore, the inspection apparatus is increasingly requested to have such a measurement function.

As to the pattern inspection apparatus, there is a case where the pattern forming surface where patterns are formed is located in the downward direction. This is for preventing a falling foreign substance from adhering to the pattern forming surface, for example. Moreover, this is because, in the exposure apparatus that transfers (prints) a pattern with using a mask, the pattern forming surface of the mask is located in the downward direction in many cases. In the pattern inspection apparatus, it is required to mount therein a light transmission inspection optical system that emits a laser light on the pattern forming surface in order to perform detection using a transmitted light, and therefore, it is difficult to support the whole mask surface to be appressed to a stage. Accordingly, the stage supports the external side of the pattern forming surface. With such a configuration, the mask is deflected (bent) by its own weight. Therefore, the pattern forming surface is bent outward by the deflection, which results in positional deviation of the pattern forming position.

By contrast, as to the writing apparatus that writes a pattern on the mask, the mask substrate is arranged such that the pattern forming surface is in the upward direction to write a pattern thereon. Also, in the writing apparatus, the whole back side of the mask is not supported either. Therefore, the mask is deflected by its own weight. However, in the writing apparatus, the writing position is corrected considering such deflection in advance. In other words, writing is performed such that a pattern is formed at a desired position when the mask is ideally horizontally arranged.

When inspecting the mask on which a pattern has been written as described above by a pattern inspection apparatus, deflection (bending) occurs also in the inspection apparatus. Therefore, even if the pattern forming position is corrected in the writing apparatus, positional deviation arises at the time of inspection by the inspection apparatus. In shape defect inspection, since determination is performed after a position adjustment between an image of a measured pattern and an image of a design pattern, even if positional deviation occurs because of such deflection, the deviation has been conventionally permitted. However, in measuring positional deviation of a pattern, positional deviation due to deflection is an unacceptable problem because it is concerned with positional deviation itself.

With regard to measurement of a CD (critical dimension) deviation, though it is not about positional deviation of a pattern, there is proposed an inspection method in which a pattern line width (critical dimension) in an image obtained for each preset region is measured, a difference from design data is calculated, and an average of all the CD differences in each region is compared with a threshold value, so that an irregular line width region is found as a CD error (dimension defect) (refer to, e.g., Japanese Patent No. 3824542).

BRIEF SUMMARY OF THE INVENTION

According to one aspect of the present invention, an inspection apparatus includes an optical image acquisition unit configured to acquire an optical image of a photomask on which a plurality of figure patterns are formed, a first measurement unit configured to measure a first positional deviation amount in a horizontal direction at each position on the photomask accompanying deflection of a surface of the photomask generated by supporting the photomask using a support method which is used for acquiring the optical image, a second measurement unit configured to measure a second positional deviation amount of each of the plurality of figure patterns, by using the optical image, and a difference map generation unit configured to generate a difference map in which a difference value obtained by subtracting the first positional deviation amount from the second positional deviation amount is used as a map value, with respect to a region on the surface of the photomask.

According to another aspect of the present invention, an inspection method includes acquiring an optical image of a photomask on which a plurality of figure patterns are formed, measuring a first positional deviation amount in a horizontal direction at each position on the photomask accompanying deflection of a surface of the photomask generated by supporting the photomask using a support method which is used for acquiring the optical image, measuring a second positional deviation amount of each of the plurality of figure patterns, by using the optical image, and generating a difference map in which a difference value obtained by subtracting the first positional deviation amount from the second positional deviation amount is used as a map value, with respect to a region on the surface of the photomask.

BRIEF DESCRIPTION OF THE DRAWINGS

FIGS. 10A and 10B show examples of positional deviation amounts according to the first embodiment;

FIG. 11 shows an example of a difference map according to the first embodiment.

DETAILED DESCRIPTION OF THE INVENTION

In the following description of embodiments, there will be described an inspection apparatus that can correct positional deviation caused by deflection (bending) of a mask when measuring positional deviation by the inspection apparatus.

First Embodiment

Figure 1:
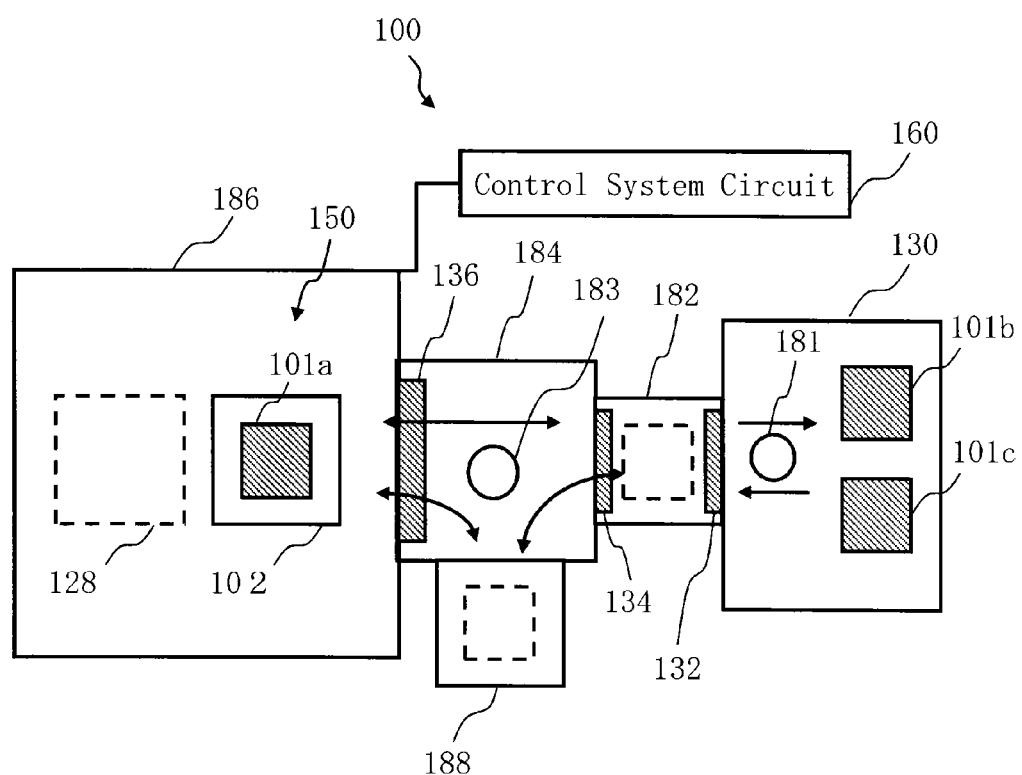
FIG. 1 illustrates a configuration of a pattern inspection apparatus when viewed from the top according to the first embodiment.

FIG. 1 illustrates a configuration of a pattern inspection apparatus when viewed from the top according to the first embodiment. In FIG. 1, an inspection apparatus 100 that inspects a defect of a pattern formed on a target object 101 such as a mask includes an input/output interface (I/F) 130, a load lock chamber 182, a robot chamber 184, an inspection chamber 186, a measurement chamber 188, and a control system circuit 160 (control unit).

In the input/output interface 130, a transfer robot 181 for transferring the target object 101 is arranged. In the robot chamber 184, a transfer robot 183 for transferring the target object 101 is arranged. At the boundaries each between two of the input/output interface 130, the load lock chamber 182, the robot chamber 184, and the inspection chamber 186, there are arranged gate valves 132, 134, and 136. The target object 101 is, for example, an exposure photomask used for transferring (printing) a pattern onto the wafer. A plurality of figure patterns to be inspected is formed on this photomask. The transfer robots 181 and 183 may be any as long as they are mechanical systems, such as an elevator mechanism and a rotation mechanism.

Figure 2:
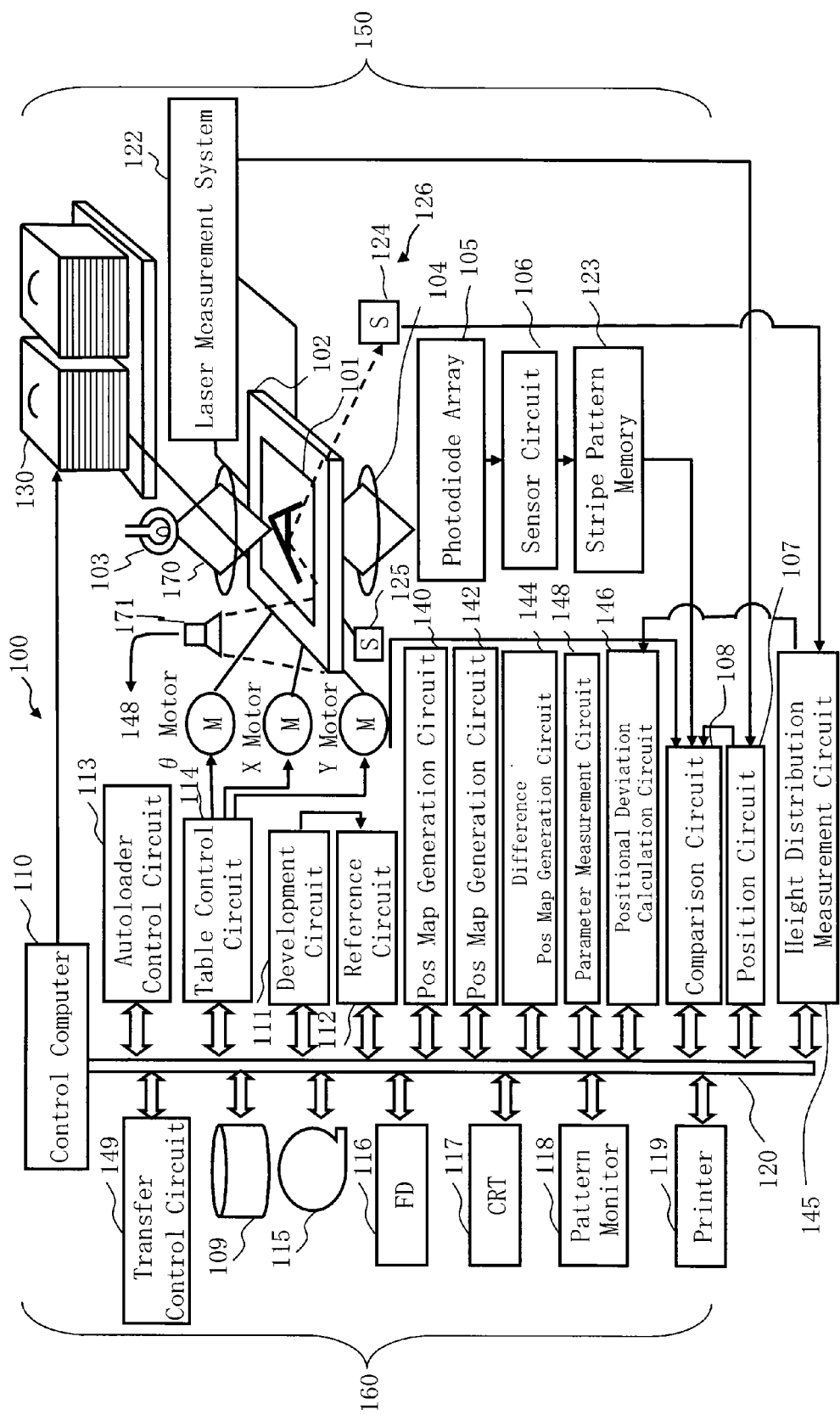
FIG. 2 shows a part of configuration of a pattern inspection apparatus according to the first embodiment.

FIG. 2 shows a part of configuration of a pattern inspection apparatus according to the first embodiment. In FIG. 2, the structure of the inspection chamber 186 and the structure of the control system circuit 160 (control unit) are mainly shown. An optical image acquisition unit 150 is arranged in the inspection chamber 186.

The optical image acquisition unit 150 includes a light source 103, an illumination optical system 170, an XYθ table 102 arranged movably, a magnifying optical system 104, a photodiode array 105 (an example of a sensor), a sensor circuit 106, a stripe pattern memory 123, the focus sensor 126 configured by a lighting device 125 and an optical receiver 124, and a laser measuring system 122. The target object 101, with its pattern forming surface facing downward, is placed on the XYθ table 102. The central part of the XYθ table 102 is open so that the pattern forming region of the target object 101 may be exposed, and the XYθ table 102 supports the target object 101 at the outside of the pattern forming region. Moreover, a camera 171 which measures the edge position of the target object 101 is arranged on the XYθ table 102.

In the control system circuit 160, a control computer 110 is connected, through a bus 120, to a position circuit 107, a comparison circuit 108, a development circuit 111, a reference circuit 112, an autoloader control circuit 113, a table control circuit 114, positional deviation map (Pos map) generation circuits 140 and 142, a difference Pos map generation circuit 144, a height position distribution measurement circuit 145, a positional deviation calculation circuit 146, a parameter measurement circuit 148, a transfer control circuit 149, a magnetic disk drive 109, a magnetic tape drive 115, a flexible disk unit (FD) 116, a CRT 117, a pattern monitor 118, and a printer 119. Moreover, the sensor circuit 106 is connected to the stripe pattern memory 123 which is connected to the comparison circuit 108. The XYθ table 102 is driven by an X-axis motor, a Y-axis motor, and a θ-axis motor. The XYθ table 102 serves as an example of the stage.

In the inspection apparatus 100, an inspection optical system of large magnification is composed of the light source 103, the XYθ table 102, the illumination optical system 170, the magnifying optical system 104, the photodiode array 105, and the sensor circuit 106. The XYθ table 102 is driven by the table control circuit 114 under the control of the control computer 110. The XYθ table 102 can be moved by a drive system such as a three-axis (X, Y, and θ) motor, which drives in the directions of x, y, and θ. For example, a step motor can be used as each of these X, Y, and θ motors. The XYθ table 102 is movable in the horizontal direction and a rotation direction by the X-, Y-, and θ-axis motors. The moving position of the XYθ table 102 is measured by the laser measuring system 122 and supplied to the position circuit 107.

FIGS. 1 and 2 show a configuration necessary for describing the first embodiment. It should be understood that other configuration elements generally necessary for the inspection apparatus 100 may also be included therein.

Figure 3A:
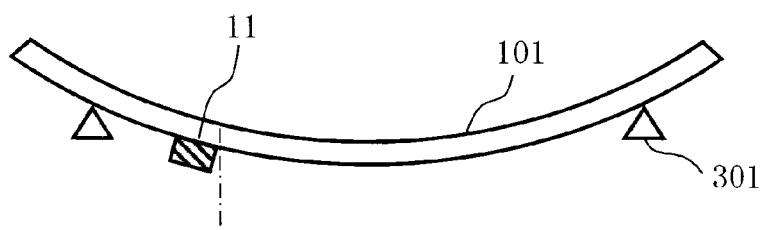
FIGS. 3A and 3B are conceptual diagrams describing deflection of a target object and positional deviation accompanying the deflection according to the first embodiment.
Figure 3B:
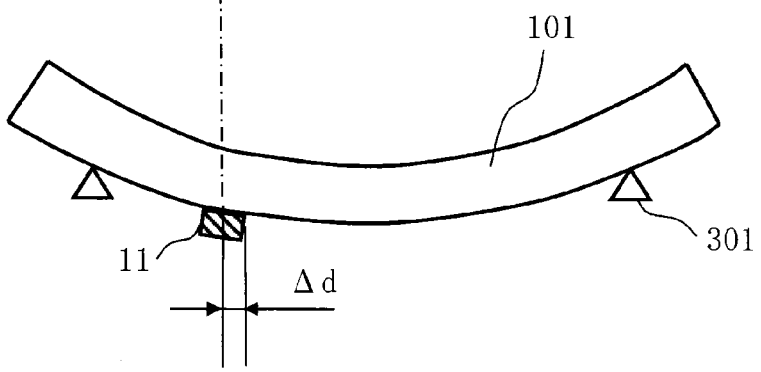

FIGS. 3A and 3B are conceptual diagrams describing deflection of a target object and positional deviation accompanying the deflection according to the first embodiment. For convenience, in FIGS. 3A and 3B, there is shown the case where the external side of the pattern forming surface of the target object 101 is simply supported by a supporting member 301. As described above, the pattern forming surface is in the upward direction in the pattern writing apparatus, and the pattern forming surface is in the downward direction in the inspection apparatus 100. When the pattern forming surface is in the upward direction, in-plane bending occurs by deflection due to its own weight, and therefore, the pattern forming surface becomes concave. As a result, the pattern position shifts inward. By contrast, when the pattern forming surface is in the downward direction as shown in FIGS. 3A and 3B, out-of-plane bending occurs by deflection due to its own weight, and therefore, the pattern forming surface becomes convex. As a result, the pattern position shifts outward. Furthermore, since the target object 101 shown in FIG. 3A whose thickness is thin is easier to bend than the target object 101 shown in FIG. 3B whose thickness is thick, the amount of deflection (bending) becomes large, thereby generating an error Δd between the amounts of positional deviation even of the same pattern 11. However, the amount of deflection of the target object 101 changes not only by these conditions but also by the thickness, outer diameter dimension, supporting position, material physical properties (especially, Poisson's ratio, longitudinal elastic modulus (Young's modulus), and density) and the like of the target object 101. If the deflected state of the pattern forming surface of the target object 101 is known, the amount of horizontal deviation at each position on the pattern forming surface can be calculated.

According to the first embodiment, the amount of horizontal deviation at each position on the pattern forming surface is calculated, for example, by simulation using a finite element method, using the thickness, outer diameter dimension, supporting position, and material physical properties of the target object 101, as parameters. Moreover, as described in the first embodiment, it is also preferable to perform simulation beforehand on the assumption of a reference mask of typical dimensions, and obtain an approximate expression treating an error amount of each parameter described above as an unknown quantity, or obtain a correction table for performing correction using an error amount of each parameter. Then, the approximate expression or coefficients of the approximate expression, or the correction table is to be input as correction data into the inspection apparatus 100. The correction data can be stored in a storage device, such as the magnetic disk drive 109. In the inspection apparatus 100 of an actual machine, with respect to the target object 101 to be inspected, each parameter mentioned above is acquired in order to calculate an amount of horizontal deviation due to deflection resulting from self-weight at each position on the pattern forming surface of the target object 101 to be inspected. Since the Poisson's ratio, longitudinal elastic modulus (Young's modulus) and the like in the parameters are known beforehand, they should be input in advance. Then, the thickness, outer diameter dimension, supporting position, and density of the target object 101 are acquired by measurement.

While the example of calculation using the thickness, outer diameter dimension, supporting position, Poisson's ratio, longitudinal elastic modulus (Young's modulus) and density of the target object 101 as six parameters has been described, it is not limited thereto. Although the precision decreases, calculation may be performed using fewer than six parameters, taking an acceptable value of measurement precision into consideration. For example, the calculation may be performed using at least one of the thickness, outer diameter dimension, and density of the target object 101. Alternatively, calculation may be performed using more parameters in addition to the six parameters.

Figure 4:
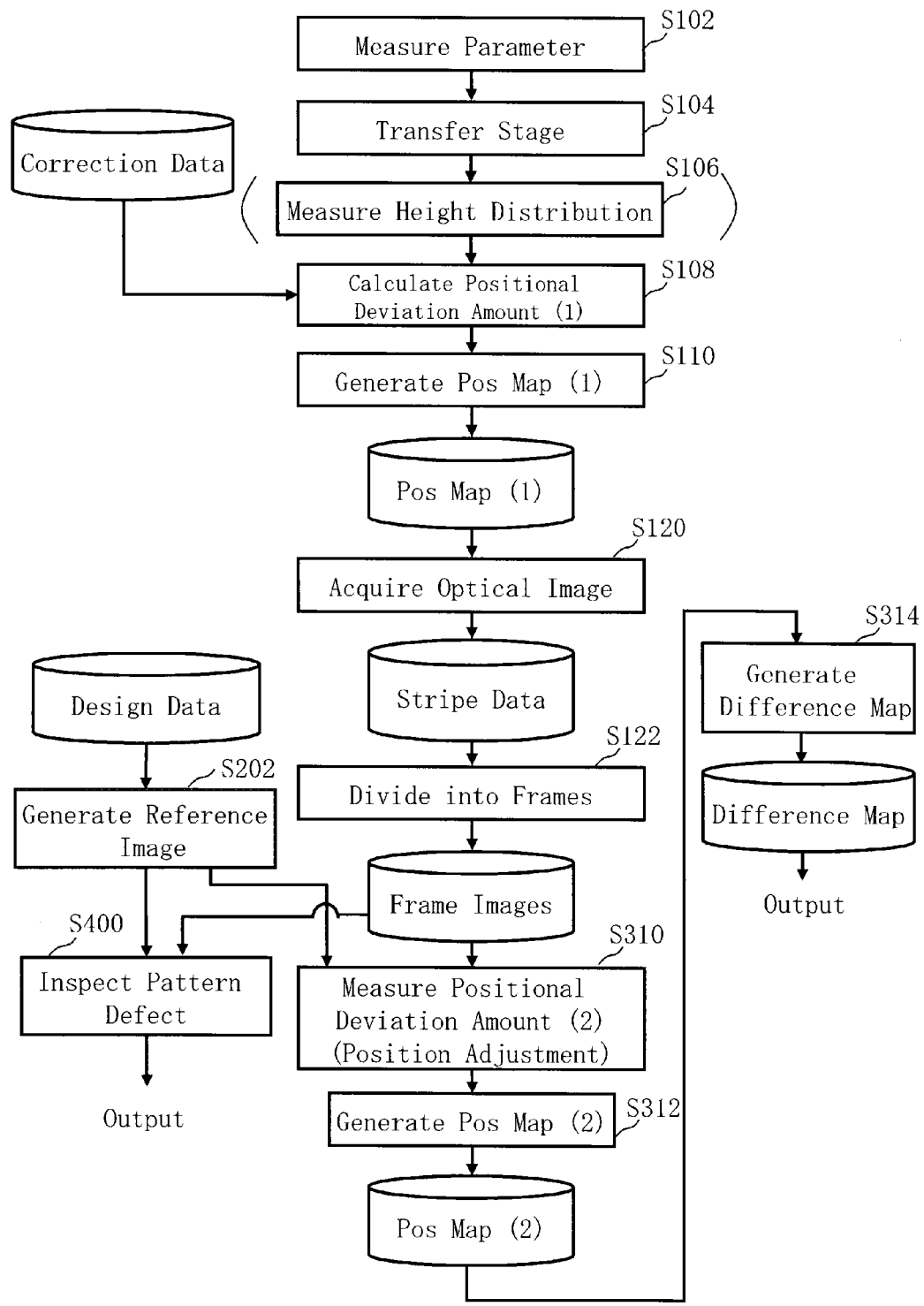
FIG. 4 is a flowchart showing main steps of an inspection method according to the first embodiment.

FIG. 4 is a flowchart showing main steps of an inspection method according to the first embodiment. In FIG. 4, the inspection method according to the first embodiment executes a series of steps: a parameter measurement step (S102), a stage transfer (deliver) step (S104), a positional deviation amount (1) calculation step (S108), a positional deviation (Pos) map (1) generation step (S110), an optical image acquisition step (S120), a dividing step (S122) into frames, a reference image generation step (S202), a positional deviation amount (2) measurement step (S310), a Pos map (2) generation step (S312), a difference map generation step (S314), and a pattern defect inspection step (S400). Moreover, as will be described later, it is also preferable to perform a height distribution measurement step (S106) instead of the parameter measurement step (S102), between the stage transfer step (S104) and the positional deviation amount (1) calculation step (S108).

First, under the control of the transfer control circuit 149, after the gate valve 132 is opened, the target object 101 arranged at the input/output interface 130 (on the autoloader) is transferred to the stage in the load lock chamber 182 by the transfer robot 181. Then, after the gate valve 132 is closed, the gate valve 134 is opened in order to transfer the target object 101 onto the stage in the measurement chamber 188 through the robot chamber 184 by the transfer robot 183.

In the parameter measurement step (S102), at least one of the parameters of outer diameter dimension, thickness, supporting position, and weight of the target object 101 (photomask) is measured in the measurement chamber 188. According to the first embodiment, the outer diameter dimension, the thickness, the supporting position, and the weight are measured. Measuring the supporting position may be performed in the measurement chamber 188, but, the case of performing it in the inspection chamber 186 is described in the first embodiment.

Figure 5:
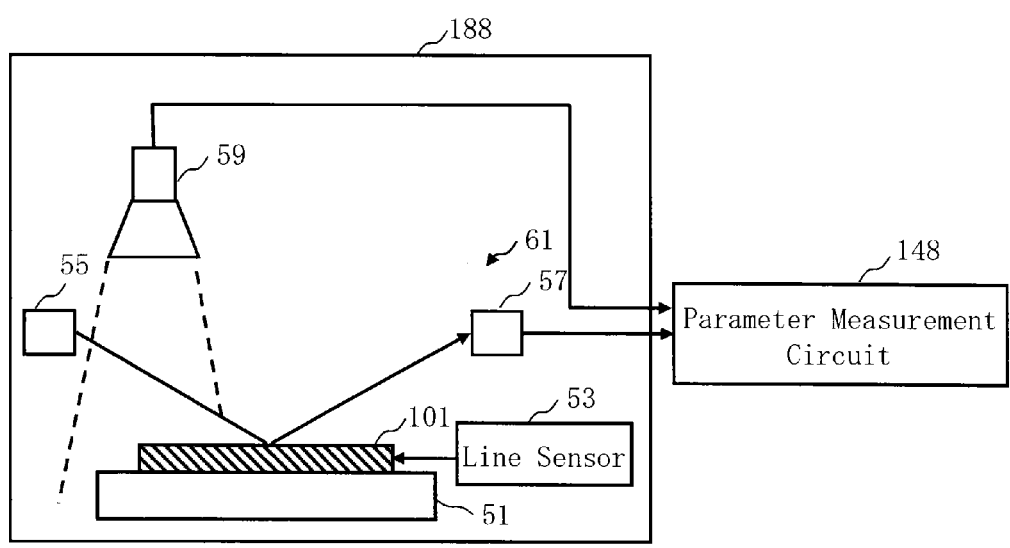
FIG. 5 shows an example of the internal structure of a measurement chamber according to the first embodiment.

FIG. 5 shows an example of the internal structure of a measurement chamber according to the first embodiment. In FIG. 5, the target object 101 conveyed into the measurement chamber 188 is temporarily placed on a stage 51 by the transfer robot 183. The stage 51 also serves as a weight scale, and measures the weight of the target object 101 placed thereon. Measured data is output to the parameter measurement circuit 148. The entire backside surface of the target object 101 touches the stage in FIG. 5, but it should be understood that there is an approach space for the handling member of the transfer robot 183, which places the target object 101 on the stage, to attach or detach the target object 101 to or from the stage 51.

Positions of the four sides (x direction and y direction) of the target object 101 are measured by a laser interference measuring apparatus or a linear scale 53. The measured data is output to the parameter measurement circuit 148.

The parameter measurement circuit 148 calculates the outer diameter dimension (horizontal dimension, x and y direction dimensions) of the surface of the target object 101, based on the positions of the four sides (x direction and y direction) of the target object 101. The outer diameter dimension of the target object 101 can be measured by the configuration described above.

Moreover, using a laser displacement gage 61 configured by a projector 55 and an optical receiver 57, the height position of the surface of the target object 101 can be measured by emitting a laser from the projector 55 to the surface of the target object 101, and receiving a catoptric light by the optical receiver 57. The measured data is output to the parameter measurement circuit 148. The parameter measurement circuit 148 calculates the thickness of the target object 101 by calculating a difference between the reference height position which is set at the backside of the target object 101 and the measured height position. The thickness of the target object 101 can be measured by the configuration described above.

Moreover, since the outer diameter dimension of the surface of the target object 101 and thickness and weight of the target object 101 haven been obtained, the parameter measurement circuit 148 can calculate the density of the target object 101.

The arrangement position of the target object 101 having been transferred onto the XYθ table 102 is measured by the camera 171 in the inspection chamber 186 to be mentioned later, but it is not limited thereto. It is also preferable to set a camera 59 above the edge position of the target object 101 in the measurement chamber 188 in order to image the edge position of the target object 101 by the camera 59. Thereby, the arrangement position of the target object 101 on the stage 51 can be measured. If the arrangement position of the target object 101 on the stage 51 in the measurement chamber 188 can be acquired, the arrangement position when being conveyed by the transfer robot 183 onto the XYθ table 102 in the inspection chamber 186 can be estimated.

The stage 51, the laser interference measuring apparatus or the linear scale 53, the laser displacement gage 61, and the camera 59 described above are examples of a measurement unit.

In the stage transfer step (S104), the target object 101 for which parameter measurement has been performed is conveyed to the robot chamber 184 from the measurement chamber 188 by the transfer robot 183, and after the gate valve 136 is opened, conveyed onto the XYθ table 102 in the inspection chamber 186, under the opening control of the transfer control circuit 149.

When the target object 101 is conveyed onto the XYθ table 102, the camera 171 in the inspection chamber 186 images the edge position of the target object 101. The imaged data is output to the parameter measurement circuit 148. The parameter measurement circuit 148 measures the arrangement position (x, y, θ) of the target object 101 on the XYθ table 102 by calculation based on the image data. Since the structure of the XYθ table 102 is known beforehand, if the arrangement position of the target object 101 on the XYθ table 102 is known, the support position of the target object 101 can be calculated.

In the positional deviation amount (1) calculation step (S108), the positional deviation calculation circuit 146 measures a positional deviation amount (1) (first positional deviation amount) in the horizontal direction at each position on the target object 101 accompanying the deflection of the surface of the target object 101 which is generated by supporting the target object 101 (photomask) using a support method that is used when acquiring an optical image. The positional deviation calculation circuit 146 calculates a positional deviation amount (1) by using the measured parameter. The positional deviation calculation circuit 146 is an example of a first measurement unit. In the first embodiment, as described above, the amount of horizontal deviation at each position on the pattern forming surface is calculated, for example, by simulation using a finite element method, using the thickness, outer diameter dimension, supporting position, and material physical properties of the target object 101, as parameters. The positional deviation calculation circuit 146 calculates an amount of horizontal deviation due to deflection resulting from self-weight at each position on the pattern forming surface, by reading correction data from the magnetic disk drive 109 and inputting each measured parameter. For example, an error (difference) is calculated between each measured parameter having been input and a corresponding parameter in the reference mask of typical dimensions used when simulation was performed beforehand. Then, the amount of horizontal deviation due to deflection resulting from self-weight at each position on the pattern forming surface is calculated by inputting the error of each parameter into the correction data. Since the Poisson's ratio, the longitudinal elastic modulus (Young's modulus) and the like in the parameters are known beforehand, it is only necessary to input them in advance. Then, data of the thickness, outer diameter dimension, supporting position, and density of the target object 101 are input to calculate the amount of horizontal deviation.

In the positional deviation (Pos) map (1) generation step (S110), the positional deviation map (Pos map) generation circuit 140 generates a positional deviation (Pos) map (1) (first positional deviation amount map) with respect to the region on the surface of the target object 101 by using the positional deviation amount (1) (first positional deviation amount) at each position on the target object 101 (photomask). The Pos map generation circuit 140 is an example of a first map generation unit.

The Pos map (1) is generated by virtually dividing the inspection region of the target object 101 into mesh regions of a predetermined size, and defining a positional deviation amount (1) corresponding to each mesh region, as a mesh value (or a map value). The predetermined size is preferably set to be, for example, the width size of the inspection stripe to be mentioned later. For example, it is set to be a region equivalent to 512×512 pixels. Although one positional deviation amount (1) is sufficient for one mesh region, if a plurality of positional deviation amounts (1) are measured, an average value or a median value of them is to be used.

In the optical image acquisition step (S120), the optical image acquisition unit 150 acquires an optical image of the target object 101 (photomask) where a plurality of figure patterns are formed.

As shown in FIG. 2, the pattern formed on the target object 101 is irradiated by a laser light (e.g., a DUV light) from the suitable light source 103, which is used as an inspection light and whose wavelength is shorter than or equal to that of the ultraviolet region, through the illumination optical system 170. The beam having penetrated the target object 101 is focused, as an optical image, to the photo-diode array 105 (an example of a sensor) through the magnifying optical system 104, to be entered thereinto. It is preferable to use, for example, a TDI (time delay integration) sensor, etc. as the photo-diode array 105.

Figure 6:
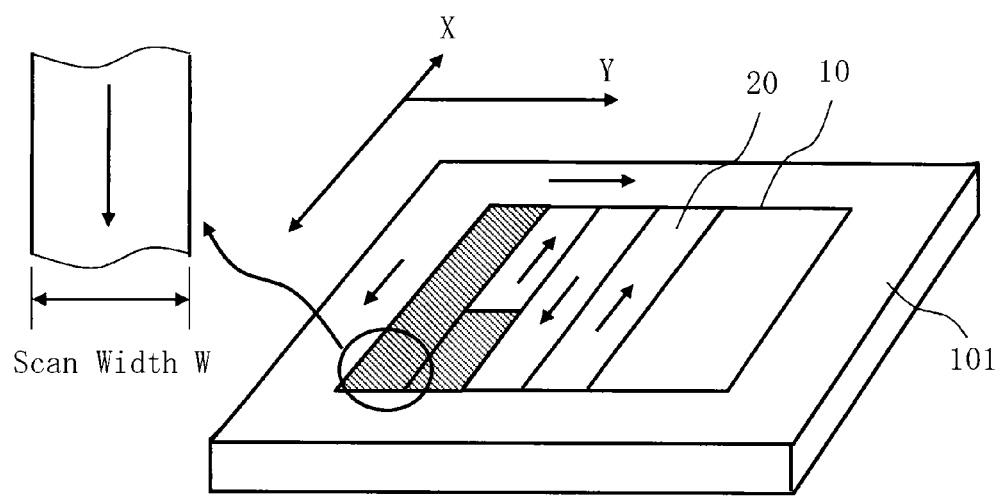
FIG. 6 is a conceptual diagram illustrating an inspection region according to the first embodiment.

FIG. 6 is a conceptual diagram illustrating an inspection region according to the first embodiment. As shown in FIG. 6, an inspection region 10 (entire inspection region) of the target object 101 is virtually divided into a plurality of strip-shaped inspection stripes 20 each having a scan width W in the y direction, for example. In the inspection apparatus 100, an image (strip region image) is acquired for each inspection stripe 20. Then, with respect to each of the inspection stripes 20, an image of a figure pattern arranged in a stripe region concerned is captured using a laser light, in the longitudinal direction (the x direction) of the stripe region concerned. Optical images are acquired by the photodiode array 105 which moves relatively in the x direction continuously by the movement of the XYθ table 102. That is, the photodiode array 105 continuously captures optical images each having a scan width W as shown in FIG. 6. In other words, the photodiode array 105, being an example of a sensor, captures optical images of patterns formed on the target object 101 by using an inspection light, while moving relatively to the XYθ table 102 (stage). According to the first embodiment, after capturing an optical image in one inspection stripe 20, the photodiode array 105 moves in the y direction to the position of the next inspection stripe 20 and similarly captures another optical image having the scan width W continuously while moving in the direction reverse to the last image capturing direction. Thereby, the image capturing is repeated in the forward(FWD) to backward (BWD) direction, namely going in the reverse direction when advancing and returning.

The direction of the image capturing is not limited to repeating the forward(FWD) and backward(BWD) movement. It is also acceptable to capture an image from a fixed one direction.

For example, repeating FWD and FWD may be sufficient, and alternatively, BWD and BWD may also be sufficient.

A pattern image focused on the photodiode array 105 is photoelectrically converted by each light receiving element of the photodiode array 105, and is further analog-to-digital (A/D) converted by the sensor circuit 106. Then, pixel data for each inspection stripe 20 is stored in the stripe pattern memory 123. When capturing an image of pixel data (stripe region image), a dynamic range whose maximum gray level is the case of 100% of an incident illumination light quantity, for example, is used as the dynamic range of the photodiode array 105. Then, the stripe region image is sent to the comparison circuit 108 with data indicating the position of the photomask 101 on the XYθ table 102 output from the position circuit 107. Measurement data (pixel data) is 8-bit unsigned data, for example, and indicates a gray level (light intensity) of brightness of each pixel.

Figure 7:
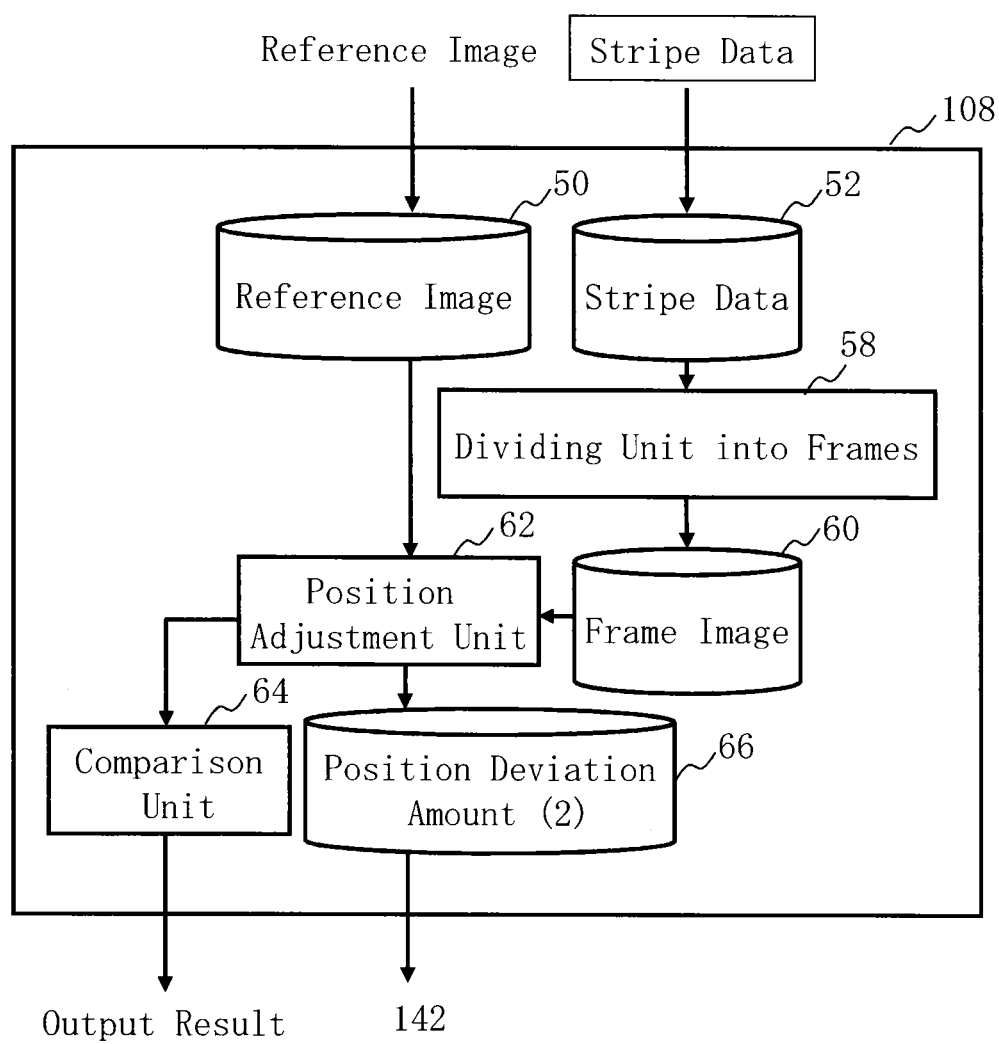
FIG. 7 shows an internal configuration of the comparison circuit according to the first embodiment.

FIG. 7 shows an internal configuration of the comparison circuit according to the first embodiment. In FIG. 7, in the comparison circuit 108, there are arranged memories 50, 52, 60, and 66, a dividing unit 58 into frames, a position adjustment unit 62 and a comparison unit 64. Functions such as the dividing unit 58 into frames, the position adjustment unit 62 and the comparison unit 64 may be configured by software such as a program causing a computer to implement these functions or by hardware such as an electronic circuit. Alternatively, they may be configured by a combination of hardware and software. Input data required in the comparison circuit 108 or a calculated result is stored in a memory (not shown) each time. The stripe region image output into the comparison circuit 108 is stored in the memory 52.

In the dividing step (S122) into frames, for each inspection stripe 20, the dividing unit 58 into frames divides, in the x direction, a stripe region image (an optical image) into a plurality of frame images (optical images) by a predetermined size (for example, by the same width as the scan width W). For example, it is divided into frame regions each having 512×512pixels. In other words, the stripe region image of each inspection stripe 20 is divided into a plurality of frame images (optical images) by the width being the same as that of the inspection stripe 20, for example, by the scan width W.

Figure 8:
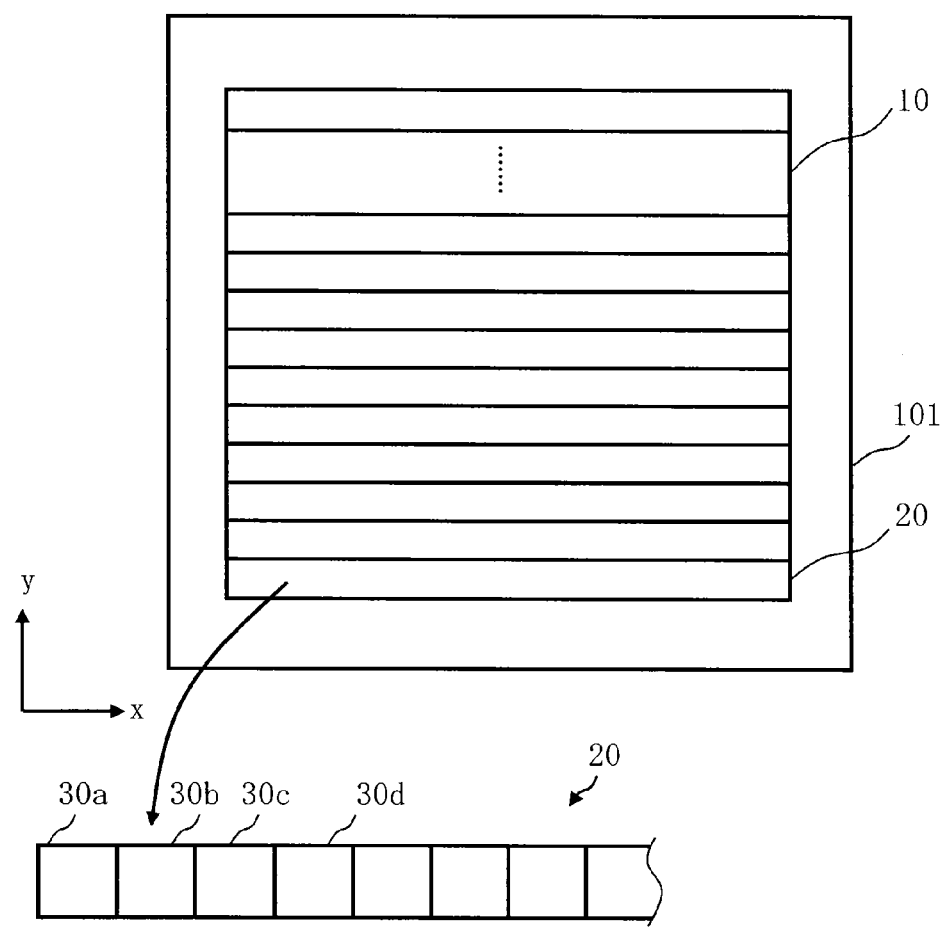
FIG. 8 shows an example of an inspection stripe and a frame region of a photomask according to the first embodiment.

FIG. 8 shows an example of an inspection stripe and a frame region of a photomask according to the first embodiment. As described above, a strip region image (an optical image) is acquired for each of a plurality of inspection stripes 20 (stripe regions) which are obtained by virtually dividing the inspection region 10 of the photomask being the target object 101 into a plurality of strip-shaped stripes. A stripe region image is divided in the x direction into a plurality of frame images by the width being the same as that of the inspection stripe 20, for example, a scan width W. Thus, the inspection region 10 is virtually divided into a plurality of frame regions 30 each being the frame image size. In other words, the inspection region 10 of the photomask is virtually divided into a plurality of strip-shaped inspection stripes 20 by the size of one side (size in the y direction) of the frame region 30, and each of the inspection stripes 20 is virtually divided into a plurality of frame regions 30 by the size of the other side (size in the x direction) of the frame region 30. By the processing described above, a plurality of frame images (optical images) corresponding to a plurality of frame regions 30 are acquired. A plurality of frame images are stored in the memory 60.

In the reference image generation step (S202), a reference image based on design data corresponding to each frame image mentioned above is generated. First, the development circuit 111 reads design data from the magnetic disk drive 109 through the control computer 110. Each figure pattern in each frame region defined in the design data having been read is converted into image data of binary values or multiple values, and the image data is transmitted to the reference circuit 112.

Figures defined in the design data are, for example, rectangles or triangles as basic figures. For example, figure data that defines the shape, size, position, and the like of each pattern figure is stored as information, such as coordinates (x, y) at a reference position of a figure, the length of a side, the figure code being an identifier for identifying a figure type, such as a rectangle or a triangle.

When information on the reference design pattern used as figure data is input to the development circuit 111, the data is developed into data of each figure. Then, a figure code, figure dimensions and the like indicating the figure shape of the figure data are interpreted. Then, reference design image data of binary values or multiple values is developed and output as a pattern arranged in a grid which is a unit of a predetermined quantization size grid. In other words, reference design data is loaded, and an occupancy rate of a figure in a reference design pattern is calculated for each grid obtained by virtually dividing an inspection region into grids of a predetermined dimensions. Then, occupancy rate data of n bits is output. For example, it is preferable that one grid is set as one pixel. When a resolution of $1/2^8$ ($=1/256$) is given to one pixel, a small region of $1/256$ is allocated to the region of a figure arranged in a pixel to calculate an occupancy rate in the pixel. Then, it is output as occupancy rate data of 8 bits to the reference circuit 112.

Next, the reference circuit 112 performs appropriate filter processing on design image data being the sent image data of a figure.

Figure 9:
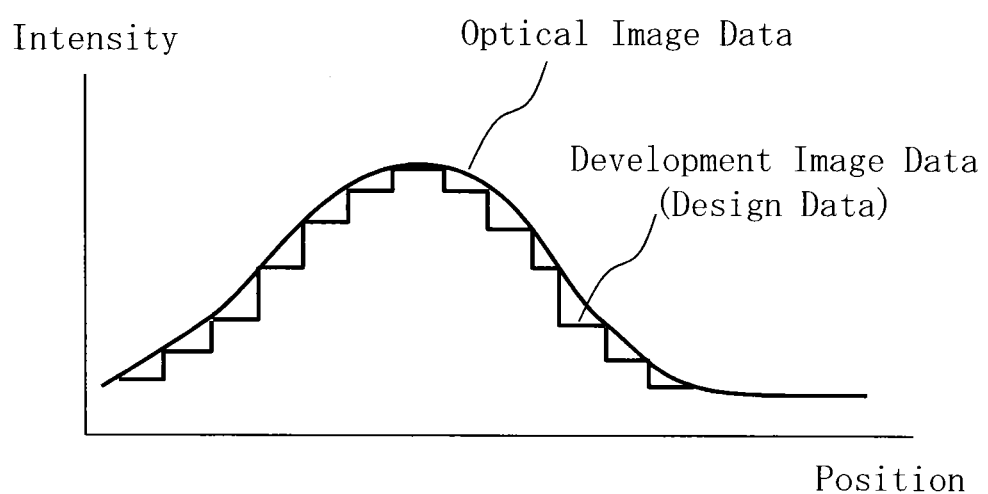
FIG. 9 illustrates filter processing according to the first embodiment.

FIG. 9 shows filter processing according to the first embodiment. Since measurement data as an optical image obtained from the sensor circuit 106 is in a state where a filter is activated by a resolution characteristic of the magnifying optical system 104, an aperture effect of the photodiode array 105 or the like, in other words, in an analog state where data changes continuously, it is possible to match with measurement data by also performing filter processing on design image data being design side image data whose image intensity (gray value) is a digital value. In this way, a design image (reference image) to be compared with a frame image (optical image) is generated. The generated reference image is output to the comparison circuit 108 to be stored in the memory 50.

As described above, a plurality of reference images of a plurality of figure patterns corresponding to a plurality of frame regions 30 whose positions are different from each other are generated. Although the case in which a shape defect inspection of a pattern is performed is here shown, if it is aimed only to generate a positional deviation map, the filtering process shown in FIG. 9 may be omitted.

In the positional deviation amount (2) measurement step (S310), the position adjustment unit 62 measures a positional deviation amount (2) (second positional deviation amount) of a plurality of figure patterns, using an optical image. The position adjustment unit 62 is an example of a second measurement unit. Specifically, it operates as follows: The position adjustment unit 62 performs position adjustment between each frame image in a plurality of frame images and a corresponding reference image in a plurality of reference images, and calculates a positional deviation amount (2) (second positional deviation amount) between a frame image concerned and a corresponding reference image, for each frame image (frame region). The position adjustment is performed while moving the whole frame region. For example, it is preferable to perform position adjustment per sub pixel, using least squares method, etc. Thereby, a positional deviation error in the case of generating the target object 101 (photomask) from design data can be obtained. The calculated positional deviation amount (2) (second positional deviation amount) for each frame region is stored in the memory 66.

FIGS. 10A and 10B show examples of positional deviation amounts according to the first embodiment. FIG. 10A shows an example of a positional deviation amount ΔPos generated, for example, when performing position adjustment in the x direction between a pattern 12 in a frame image obtained from the target object 101 serving as an actual mask and a pattern 14 in a reference image. FIG. 10B shows an example of a positional deviation amount ΔPos generated, for example, when performing position adjustment in the y direction between the pattern 12 in a frame image obtained from the target object 101 serving as an actual mask and a pattern 15 in a reference image. Although only one figure is shown in each of the examples of FIGS. 10A and 10B, position adjustment is performed uniformly moving the entire frame region, using a frame image obtained from the target object 101 being an actual mask and a reference image. It is preferable, for example, that the position adjustment is performed per sub pixel, using a least-squares method etc. Thereby, a positional deviation amount corresponding to a position shift amount can be obtained.

In the Pos map (2) generation step (S312), the Pos map generation circuit 142 generates a positional deviation (Pos) map (2) (second positional deviation amount map) with respect to the region on the surface of the target object 101, using a positional deviation amount (2) (second positional deviation amount) of a plurality of figure patterns. The Pos map generation circuit 142 is an example of a second map generation unit.

The Pos map (2) is generated by defining the positional deviation amount (2) corresponding to each frame region, as a mesh value (or a map value). For example, it is set for the region equivalent to 512×512 pixels. One positional deviation amount (2) is measured in one mesh region.

By the processing described above, the Pos map (1) in the horizontal direction due to deflection resulting from self-weight by the above, and the Pos map (2) in the horizontal direction obtained from an optical image (frame image) of the actual target object 101 can be generated. The Pos map (2) includes, in addition to a horizontal deviation amount generated when a pattern is written, a horizontal deviation amount resulting from deflection by self-weight. Therefore, according to the first embodiment, the horizontal deviation amount generated when a pattern is written is calculated by excluding the horizontal deviation amount resulting from deflection by self-weight.

In the difference map generation step (S314), the difference Pos map generation circuit 144 generates a difference map in which a map value is a difference value obtained by subtracting a positional deviation amount (1) (first positional deviation amount) from the positional deviation amount (2) (second positional deviation amount), with respect to a region on the surface of the target object 101 (photomask). The difference Pos map generation circuit 144 is an example of a difference map generation unit.

FIG. 11 shows an example of a difference map according to the first embodiment. As shown in FIG. 11, the difference map is generated in which a mesh value is defined for each frame region 30 in the inspection region 10 of the target object 101. In other words, the difference map is generated by defining a difference value for each of a plurality of mesh regions obtained by virtually dividing the inspection region 10 of the target object 101 by the size of the frame region 30 into meshes. Since both the Pos map (1) and Pos map (2) are defined by the same mesh size, a difference map is generated by subtraction between the Pos map (2) and the Pos map (1). The generated positional deviation difference map is output to, for example, the magnetic disk drive 109, magnetic tape drive 115, FD 116, CRT 117, pattern monitor 118, or printer 119. Alternatively, it may be output outside.

As described above, according to the first embodiment, it is possible to correct a positional deviation due to deflection of the mask in performing positional deviation measurement by the inspection apparatus 100. Therefore, it becomes possible to evaluate the original positional deviation of the pattern itself.

In the pattern defect inspection step (S400), the comparison unit 64 compares, for each pixel, a frame image and a reference image for which position adjustment has been performed, in accordance with a predetermined algorithm, to determine the existence or nonexistence of a defect. A determination result is output to, for example, the magnetic disk drive 109, magnetic tape drive 115, FD 116, CRT 117, pattern monitor 118, or printer 119. Alternatively, it may be output outside.

After the target object 101 has been inspected, the gate valve 136 is opened to transfer the target object 101 from the inspection chamber 186 to the robot chamber 184 by the transfer robot 183, and after the gate valve 136 is closed, the gate valve 134 is opened in order to transfer the target object 101 from the robot chamber 184 to the load lock chamber 182. Then, after the gate valve 134 is closed, the gate valve 132 is opened in order to transfer the target object 101 from the load lock chamber 182 to the input/output interface 130 by the transfer robot 181.

In the examples described above, each parameter is measured before the target object 101 is conveyed to the inspection chamber 186, but it is not limited thereto. Each parameter may be measured in the measurement chamber 188 after the defect inspection has been completed and the target object 101 has been transferred out of the inspection chamber 186. In that case, although the order of a series of steps from the parameter measurement step (S102) to the Pos map (1) generation step (S110) and a series of steps from the optical image acquisition step (S120) to the Pos map (2) generation step (S312) becomes reversed, no problem occurs.

Second Embodiment

In the first embodiment, a deviation amount (1) in the horizontal direction is calculated by measuring each parameter in the measurement chamber 188 and inputting each parameter value into correction data, it is not limited thereto. In the second embodiment, a configuration where the amount of deflection resulting from self-weight is directly measured by measuring the height position of the pattern forming surface of the target object 101 will be described.

The configuration of the inspection apparatus 100 according to the second embodiment is the same as that of FIGS. 1 and 2. The inspection method is the same as that shown in FIG. 4 except that, instead of the parameter measurement step (S102), the height distribution measurement step (S106) shown with the parenthesis is added between the stage transfer step (S104) and the positional deviation amount (1) calculation step (S108).

According to the second embodiment, since each parameter described in the first embodiment is not measured, the measurement chamber 188 shown in FIG. 1 and the camera 171 shown in FIG. 2 may be omitted. The contents of the stage transfer step (S104) are the same as those of the first embodiment.

In the height distribution measurement step (S106), the height position distribution measurement circuit 145 (an example of the first measurement unit) measures the amount of deflection in the state where the target object 101 is laid on the XYθ table 102 (stage) and supported by the XYθ table 102, and calculates a positional deviation amount (1) (first positional deviation amount), using the amount of deflection.

Figure 12:
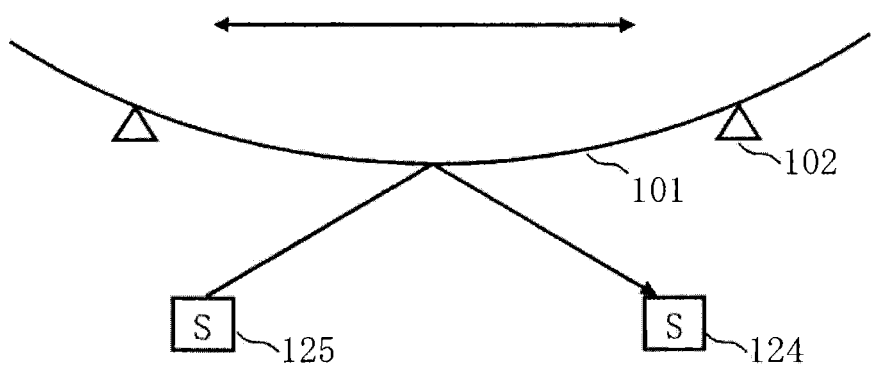
FIG. 12 is a conceptual diagram showing a measuring method of a height distribution according to the second embodiment.

FIG. 12 is a conceptual diagram showing a measuring method of a height distribution according to the second embodiment. Specifically, while moving the XYθ table 102 (stage) in the horizontal direction in the state where the target object 101 (photomask) is supported by the XYθ table 102, focal positions at a plurality of positions on the surface of the target object 101 are measured by the focus sensor 126. The focus sensor 126 measures a height position by emitting a light from the lighting device 125 to each position on the surface of the target object 101 and receiving a catoptric light by the optical receiver 124. The measured height position data at each position is output to the height position distribution measurement circuit 145. In the height position distribution measurement circuit 145, a height distribution of the surface of the target object 101 is calculated from the height position information on each position, and the amount of deflection is calculated from the height distribution. According to the second embodiment, since the pattern forming surface is facing downward, the amount of deflection can be calculated by irradiating the pattern forming surface with a laser from the lower side and measuring a height position using the catoptric light.

Alternatively, it is also preferable to measure a height distribution by arranging a Fizeau interferometer 128 shown in FIG. 1 in the inspection chamber 186. In that case, the XYθ table 102 is moved to the position where the surface of the target object 101 overlaps with the Fizeau interferometer 128. Then, the height position distribution of the surface of the target object 101 is measured by the Fizeau interferometer 128 in the state where the target object 101 (photomask) is supported by the XYθ table 102 and the XYθ table 102 is not moved. The measurement result data by the Fizeau interferometer 128 is output to the height position distribution measurement circuit 145. In the height position distribution measurement circuit 145, the amount of deflection of the surface of the target object 101 is calculated from the height distribution obtained by the Fizeau interferometer 128.

In the positional deviation amount (1) calculation step (S108), by using a height distribution of the pattern forming surface, the positional deviation calculation circuit 146 calculates (measures), using a predetermined equation, a positional deviation amount (1) (first positional deviation amount) in the horizontal direction at each position on the target object 101, accompanying deflection of the surface of the target object 101 resulting from supporting the target object 101 (photomask) by the XYθ table 102.

As described above, it is also preferable to directly measure the height position of the pattern forming surface of the target object 101, calculate the amount of deflection resulting from its own weight, and obtain a positional deviation amount (1) (first positional deviation amount) in the horizontal direction at each position on the target object 101 accompanying the deflection. The contents of each step after the Pos map (1) generation step (S110) are the same as those in the first embodiment.

In the above description, what is described as "circuit" or "step" can be configured by hardware such as an electronic circuit or by software such as programs that are operable on the computer. Alternatively, they may be implemented by a combination of hardware and software, or a combination with firmware. When configured by programs, the programs are stored in a recording medium, such as a magnetic disk drive, magnetic tape drive, FD, or ROM (Read Only Memory). For example, functions such as the table control circuit 114, the development circuit 111, the reference circuit 112, the comparison circuit 108, the positional deviation map (Pos map) generation circuits 140 and 142, the difference Pos map generation circuit 144, the height distribution measurement circuit 145, the positional deviation calculation circuit 146, and the parameter measurement circuit 148, which configure the calculation control unit, may be configured by electric circuits. Alternatively, they may be implemented as software to be processed by the control computer 110, or implemented by a combination of electric circuits and software.

Referring to specific examples, embodiments have been described above. However, the present invention is not limited to these examples. For example, the transmission illumination optical system which uses a transmitted light is described as the illumination optical system 170 in the embodiments, but it is not limited thereto. For example, it may be a reflection illumination optical system which uses a reflected light. Alternatively, it is also preferable to simultaneously use a transmitted light and a reflected light by combining the transmission illumination optical system and the reflection illumination optical system.

While the apparatus configuration, control method, and the like not directly necessary for explaining the present invention are not described, some or all of them may be suitably selected and used when needed. For example, although description of the configuration of a control unit for controlling the inspection apparatus 100 is omitted, it should be understood that some or all of the configuration of the control unit is to be selected and used appropriately when necessary.

In addition, any other pattern inspection apparatus, pattern inspection method, and inspection sensitivity evaluation method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inspection apparatus comprising:
optical image acquisition processing circuitry configured to acquire an optical image of a photomask on which a plurality of figure patterns are formed;
first measurement processing circuitry configured to measure a first positional deviation amount in a horizontal direction at each position on the photomask accompanying deflection of a surface of the photomask generated by supporting the photomask using a support method which is used for acquiring the optical image, said first positional deviation amount in the horizontal direction occurring by deflection due to the weight of the photomask and being generated at each position of the surface of the photomask, not dependent on the plurality of figure patterns;
second measurement processing circuitry configured to measure a second positional deviation amount of each of the plurality of figure patterns, by using the optical image; and
difference map generation processing circuitry configured to generate a difference map in which a difference value obtained by subtracting the first positional deviation amount from the second positional deviation amount is used as a map value, with respect to a region on the surface of the photomask.

2. The apparatus according to claim 1, further comprising:
measurement processing circuitry configured to measure at least one of parameters of an outer diameter dimension, thickness, and weight of the photomask;
first map generation processing circuitry configured to generate a first positional deviation amount map, with respect to the region on the surface of the photomask, using the first positional deviation amount at the each position on the photomask; and
second map generation processing circuitry configured to generate a second positional deviation amount map, with respect to the region on the surface of the photomask, using the second positional deviation amount of the each of the plurality of figure patterns,
wherein the first measurement processing circuitry calculates the first positional deviation amount by using a measured parameter, and
the difference map generation processing circuitry generates the difference map by subtraction between the second positional deviation amount map and the first positional deviation amount map.

3. The apparatus according to claim 1, wherein
the optical image acquisition processing circuitry has a stage for supporting the photomask, and
the first measurement processing circuitry measures a deflection amount in a state where the photomask is supported by the stage, and calculates the first positional deviation amount by using the deflection amount.

4. The apparatus according to claim 3, wherein
the first measurement processing circuitry has a focus sensor that measures focal positions at a plurality of positions on the surface of the photomask while moving the stage in the horizontal direction in a state where the photomask is supported by the stage.

5. The apparatus according to claim 3, wherein
the first measurement processing circuitry has a Fizeau interferometer that measures a height position distribution of the surface of the photomask in the state where the photomask is supported by the stage and the stage is not moved.

6. The apparatus according to claim 1, further comprising:
a measurement chamber configured to temporarily arrange the photomask therein,
wherein at least one of parameters of an outer diameter dimension, thickness, and weight of the photomask is measured in the measurement chamber.

7. The apparatus according to claim 6, wherein
the first positional deviation amount is calculated by simulation by a finite element method, using the at least one of parameters.

8. The apparatus according to claim 1, further comprising:
dividing processing circuitry configured to divide the optical image into a plurality of frame images,
wherein the second positional deviation amount is measured using the plurality of frame images.

9. The apparatus according to claim 8, wherein
the second measurement processing circuitry calculates the second positional deviation amount between a frame image concerned in the plurality of frame images and a corresponding reference image in a plurality of reference images, for each of the plurality of frame images, by performing position adjustment between the each of the plurality of frame images and the corresponding reference image in the plurality of reference images.

10. An inspection method comprising:

acquiring an optical image of a photomask on which a plurality of figure patterns are formed;

measuring a first positional deviation amount in a horizontal direction at each position on the photomask accompanying deflection of a surface of the photomask generated by supporting the photomask using a support method which is used for acquiring the optical image, said first positional deviation amount in the horizontal direction occurring by deflection due to the weight of the photomask and being generated at each position of the surface of the photomask, not dependent on the plurality of figure patterns;

measuring a second positional deviation amount of each of the plurality of figure patterns, by using the optical image; and generating a difference map in which a difference value obtained by subtracting the first positional deviation amount from the second positional deviation amount is used as a map value, with respect to a region on the surface of the photomask.

11. An inspection apparatus comprising:

an optical image acquisition means for acquiring an optical image of a photomask on which a plurality of figure patterns are formed;

a first measurement means for measuring a first positional deviation amount in a horizontal direction at each position on the photomask accompanying deflection of a surface of the photomask generated by supporting the photomask using a support method which is used for acquiring the optical image, said first positional deviation amount in the horizontal direction occurring by deflection due to the weight of the photomask and being generated at each position of the surface of the photomask, not dependent on the plurality of figure patterns;

a second measurement means for measuring a second positional deviation amount of each of the plurality of figure patterns, by using the optical image; and a difference map generation means for generating a difference map in which a difference value obtained by subtracting the first positional deviation amount from the second positional deviation amount is used as a map value, with respect to a region on the surface of the photomask.

* * * * *